(12) United States Patent
Sinclair et al.

(10) Patent No.: US 11,226,685 B2
(45) Date of Patent: Jan. 18, 2022

(54) HAPTIC CONTROLLER

(71) Applicant: Microsoft Technology Licensing, LLC, Redmond, WA (US)

(72) Inventors: Michael Jack Sinclair, Kirkland, WA (US); Mar Gonzalez Franco, Seattle, WA (US); Christian Holz, Seattle, WA (US); Eyal Ofek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 16/439,596

(22) Filed: Jun. 12, 2019

(65) Prior Publication Data

US 2020/0393904 A1 Dec. 17, 2020

(51) Int. Cl.
| | |
|---|---|
| *G06F 3/01* | (2006.01) |
| *G06F 3/0481* | (2013.01) |
| *B25J 9/00* | (2006.01) |
| *G05G 5/18* | (2006.01) |
| *G05G 13/00* | (2006.01) |

(52) U.S. Cl.
CPC ............ *G06F 3/016* (2013.01); *B25J 9/0054* (2013.01); *G05G 5/18* (2013.01); *G05G 13/00* (2013.01); *G06F 3/011* (2013.01); *G06F 3/014* (2013.01); *G06F 3/04815* (2013.01)

(58) Field of Classification Search
CPC .......... G06F 3/011; G06F 3/014; G06F 3/016
See application file for complete search history.

(56) References Cited

U.S. PATENT DOCUMENTS

| | | | |
|---|---|---|---|
| 5,796,354 A * | 8/1998 | Cartabiano | ............ G06F 3/014 |
| | | | 273/148 B |
| 6,020,875 A | 2/2000 | Moore et al. | |
| 6,036,495 A | 3/2000 | Marcus et al. | |
| 6,061,004 A | 5/2000 | Rosenberg | |
| 6,946,812 B1 | 9/2005 | Martin et al. | |
| 7,318,361 B2 | 1/2008 | Boutteville et al. | |
| 7,480,600 B2 * | 1/2009 | Massie | .................. B25J 9/1689 |
| | | | 318/628 |
| 8,545,323 B2 | 10/2013 | McVicar et al. | |
| 2004/0145563 A9 | 7/2004 | Rosenberg et al. | |

(Continued)

FOREIGN PATENT DOCUMENTS

| | | |
|---|---|---|
| WO | 2015006612 A1 | 1/2015 |
| WO | 2018113293 A1 | 6/2018 |

OTHER PUBLICATIONS

Faulring, et al., "Haptic display of constrained dynamic systems via admittance displays", In Journal of IEEE Transactions on Robotics, vol. 23, Issue 1, Feb. 2007, pp. 1-11.

(Continued)

*Primary Examiner* — Albert K Wong
(74) *Attorney, Agent, or Firm* — Rainier Patents, P.S.

(57) ABSTRACT

The present concepts relate to haptic controllers. In one example the haptic controller can include first and second capstans rotationally secured to a base and an energy storage mechanism connected between the first and second capstans. The example haptic controller can also include a user engagement assembly secured to the first capstan and a controller configured to control rotational forces imparted on the user engagement assembly by controlling rotational friction experienced by the first and second capstans.

20 Claims, 8 Drawing Sheets

(56) References Cited

U.S. PATENT DOCUMENTS

2008/0009771 A1    1/2008    Perry et al.
2013/0194083 A1    8/2013    Rao

OTHER PUBLICATIONS

Gosselin, et al., "Development of a New Backdrivable Actuator for Haptic Interfaces and Collaborative Robots", In Journal of Actuators, vol. 5, No. 2, Jun. 9, 2016, pp. 1-26.

In, et al., "Capstan Brake: Passive Brake for Tendon-Driven Mechanism", In Proceedings of IEEE/RSJ International Conference on Intelligent Robots and Systems, Oct. 7, 2012, pp. 2301-2306.

Mehmood, et al., "Rotational Twisted String Actuator with Linearized Output: Mathematical Model and Experimental Evaluation", In Proceedings of the IEEE International Conference on Advanced Intelligent Mechatronics, Jul. 7, 2015, pp. 1072-1077.

"Capstan equation", Retrieved from <<https://en.wikipedia.org/wiki/Capstan_equation>>, Retrieved date: Mar. 20, 2019, 5 Pages.

"Stick-slip phenomenon", Retrieved from <<https://en.wikipedia.org/wiki/Stick-slip_phenomenon>>, Retrieved date: Mar. 20, 2019, 3 Pages.

Conti, et al., "A New Actuation Approach for Haptic Interface Design", In Proceedings of the International Journal of Robotics Research, vol. 28, Issue 6, Jun. 2009, pp. 834-848.

Blake et al., "Haptic Glove with MR Brakes for Virtual Reality", In Journal of IEEE/ASME Transactions on Mechatronics, vol. 14, Issue 5, Oct. 1, 2009, pp. 606-615.

"International Search Report and Written Opinion Issued in PCT Application No. PCT/US2020/030008", dated Jul. 20, 2020, 13 Pages.

Sinclair et al., "CapstanCrunch: A Haptic VR Controller with user-supplied Force Feedback", In Proceedings of the 32nd Annual ACM Symposium on user Interface Software and Technology, Oct. 20, 2019, pp. 815-829.

Tsai et al., "ElasticVR: Providing Muti-level Active and Passive Force Feedback in Virtual Reality using Elasticity", In Proceedings of the CHI Conference on Human Factors in Computing Systems, Apr. 20, 2018, 4 Pages.

* cited by examiner

HAPTIC CONTROLLER

BACKGROUND

In real life, humans tend to use their hands to interact with objects. They tend to reach out for such objects, touch, grasp, manipulate, and release them. In virtual reality (VR) however, such fine grained interaction with virtual objects is generally not possible today. Commercially available VR controllers that are commonly used for interaction lack the ability to render realistic haptic feedback and support such natural use.

Research on haptic controllers in the context of realistic interaction in VR has recently become popular and produced a variety of prototypes that compete with the haptic rendering capabilities of gloves. To provide more natural haptic experiences when interacting with virtual objects, individual controllers have been designed to render feedback in response to touching, dragging, single-handed grasping and bi-manual grabbing. All of these controllers contain intricate mechanisms to produce reasonable fidelity haptic sensations.

The main constraint to successfully rendering haptics for virtual objects in a realistic way is that a controller has to be built to produce and endure human-scale forces during interaction and persist in rendering feedback, especially when grasping and squeezing objects when the force on the controller is potentially highest. Achieving such magnitude of forces on handheld controllers is challenging, especially since such devices tend not to be earth-grounded.

Researchers have introduced a variety of controllers that produce strong grasping feedback. One solution is using an active mechanism with a strong servo motor, which results in a heavy, expensive, non-robust, and power-hungry design. An alternative is resisting the user applied force with a brake and stops input movement at programmable points, which can sustain high forces, but locks in the grasp at a certain point and requires manual release. This on-off lock is good for grasping rigid objects, but falls behind for rendering compliant objects, or rigid objects that require a computer-controlled release (e.g., crushing a can or glass of water). The present concepts can address any of these and/or other issues.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. In some cases, parentheticals are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

DETAILED DESCRIPTION

The present concepts relate to energy-storing resistive haptic controllers that can be used in a virtual reality environment (including augmented reality and/or mixed reality) and/or other environments to simulate natural motions. The energy-storing resistive haptic controllers or ESR haptic controllers can be configured for various usage scenarios, such as relating to the users' fingers, hands, wrists, arms, head/neck, leg, etc. In some configurations, the ESR haptic controller may be manifest as a handheld rigid natural user interface (NUI) that can be used in cooperation with the users' hand to manipulate virtual objects using fine-grained dexterity manipulations. The ESR haptic controller can also provide a multipurpose tactile experience. For example, the ESR haptic controller can be manifest as a force resisting, ungrounded haptic controller that renders haptic feedback for touching and grasping both rigid and compliant objects in a VR environment. In contrast to previous controllers, the present ESR haptic controller implementations can render human-scale forces without the use of large, high force, electrically power consumptive, and/or expensive actuators.

The present concepts can provide ESR haptic controllers that can sustain human-scale forces. The ESR haptic controller can employ controlled brake technology to render grasp feedback at varying stiffness and/or compliance levels. Resistive devices for haptics have advantages over active direct motor haptics in areas of stability, safety, power requirements, complexity, speed, force per device weight, and/or cost. The ESR haptic controllers can utilize a capstan-based brake to produce variable pure resistive forces and a clutch-able spring that is capable of outputting the stored energy of a built-in spring for the perception of compliance. This duality of the capstan brake plus the clutched spring can create a unique ESR haptic controller that goes beyond the limitations of a binary brake or spring and can also exhibit human-scale forces.

Figure 1:
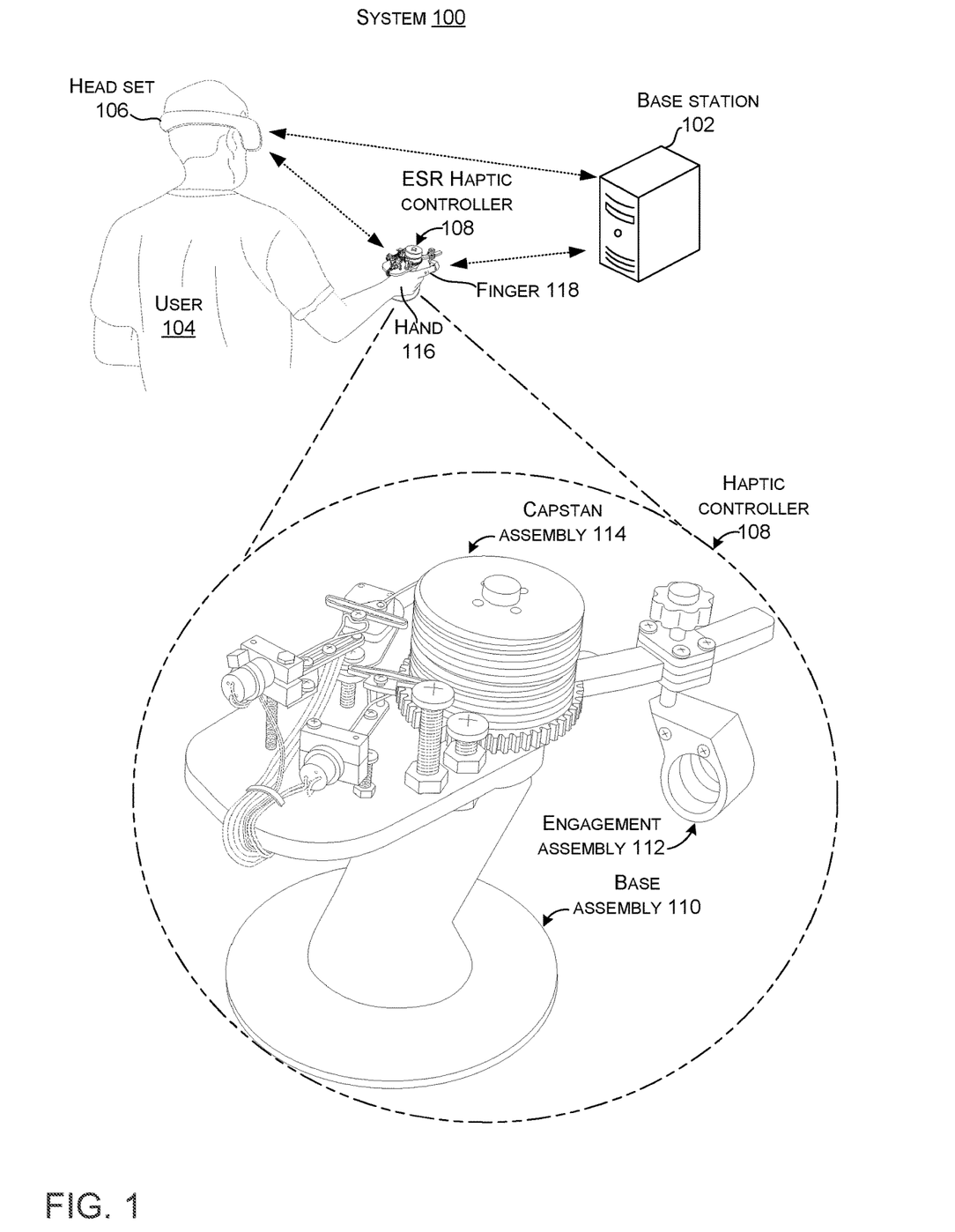
FIGS. 1 and 9 illustrate an example system where energy-storing resistive haptic control concepts can be employed, consistent with some implementations of the present concepts.

FIG. 1 illustrates a virtual reality system 100, consistent with some implementations of the present concepts. The virtual reality system 100 can include a base station 102. The base station 102 can include hardware and/or software for generating and executing a virtual reality world, including receiving and processing inputs from a user 104, and generating and outputting feedback to the user 104. The base station 102 may be any computing device, including a personal computer (PC), server, gaming console, smartphone, tablet, notebook, automobile, simulator, etc.

In some implementations, the virtual reality system 100 can include a headset 106 (or other smart wearable). The headset 106 may be, for example, a head-mounted display (HMD) that can receive information relating to the virtual reality, the real world (e.g., the scene), and/or the user. In some implementations, the headset 106 may include one or more sensors (not shown in FIG. 1) for providing inputs to the base station 102 and/or the headset 106. The sensors may include, for example, accelerometers, gyroscopes, cameras, microphones, etc. The headset 106, therefore, may be capable of detecting objects in the user's surrounding, the position of the user's head, the direction the user's head is facing, whether the user's eyes are opened or closed, which direction the user's eyes are looking, etc. The headset can have capabilities to present data, such as audio and/or visual data to the user 104.

The virtual reality system 100 may further include ESR haptic controller 108. The ESR haptic controller 108 can include a base assembly 110, an engagement assembly 112, and/or a capstan assembly 114. Consistent with the present concepts, the ESR haptic controller 108 may be a handheld device that the user 104 can hold in his/her hand 116 and manipulate with one or more of his/her fingers 118 to provide inputs and/or outputs with the base station 102 and/or the headset 106. (In other implementations, the ESR haptic controller may be configured to work with other body parts). The ESR haptic controller 108 may function cooperatively with the headset 106 and/or the base station 102 to create realistic augmented experiences for the user. For instance, the headset 106 may show the user holding an object, such as a ball and the ESR haptic controller 108 may mimic the sensation of the user squeezing the ball. As mentioned above (and as is explained in more detail below), the ESR haptic controller can create different user sensations, to mimic squeezing an inelastic ball, such as a ball of clay compared to squeezing an elastic ball, such as a foam ball or a tennis ball.

Briefly, the ESR haptic controller 108 may directly and/or indirectly sense finger motions and/or forces. Similarly, the ESR haptic controller may impart forces on the fingers 118. Furthermore, the ESR haptic controller 108 may receive haptic information from the virtual reality world being executed by the base station 102 and/or the headset 106 and can render the haptic information to one or more of the user's fingers 118 and/or transmit information from the user's fingers back to the base station 102 and/or the headset 106. In this case, the haptic information can relate to the user's index finger with the other fingers and the thumb gripping the ESR haptic controller. In other configurations, the engagement assembly 112 may accommodate more and/or different fingers and/or the thumb, for example.

Note that the illustrated system implementation includes base station 102, headset 106, and ESR haptic controller 108. Other system implementations are contemplated. For instance, the headset 106 can be a robust self-contained device that performs the function of the base station. In such a case, the described functionality can be achieved with the headset 106 and the ESR haptic controller 108, for example. Further, the ESR haptic controller 108 can be utilized in other scenarios beyond the augmented reality scenario provided here for purposes of explanation. In some cases, the ESR haptic controller 108 can be a robust self-contained device. In other cases, the ESR haptic controller can rely on other devices, such as the headset or base station to perform some functionality on behalf of the ESR haptic controller.

Most traditional haptic controllers that apply forces directly to human limb(s) are of the electro-mechanical active type—they actively produce human-scale forces or torques from an applied electrical signal. They convert electrical energy directly into the force or torque that is required. This may require a large electrical power to create the force. The active actuator, especially in mobile devices with haptics, many times consists of a small electrical motor that is geared down to produce the large forces required. This can result in a slow actuation speed, large battery power demand, a brittle device that can be compromised by the human applying too much force, and/or a combination of these problems.

The traditional haptic controllers can also pose a safety problem, possibly pinching fingers. In contrast, the present implementations can employ resistive actuators to resist external mechanical movement (human input). This resistive actuator can supply the haptic response to the human limb movement with greater resistive force, while consuming much less electrical power, operating faster than the traditional servo plus gearbox solutions, and/or not be compromised by the user imparting excessive forces on the resistive actuator (e.g., the ESR haptic controller can provide built-in fault tolerance by slipping before breaking if the user employs excessive forces on the ESR haptic controller). Traditional resistance haptic devices do not offer anything in the way of energy storage. The present concepts can offer the ability to simulate a spring and can simulate a non-rigid (squishy) virtual object. Thus, the present ESR haptic controllers can provide resistive braking to user movement and energy storage from the user movement—e.g., the user can provide the energy to the system. This combination can provide more realistic experiences to the user when squeezing both inelastic and elastic virtual objects.

Figure 2:
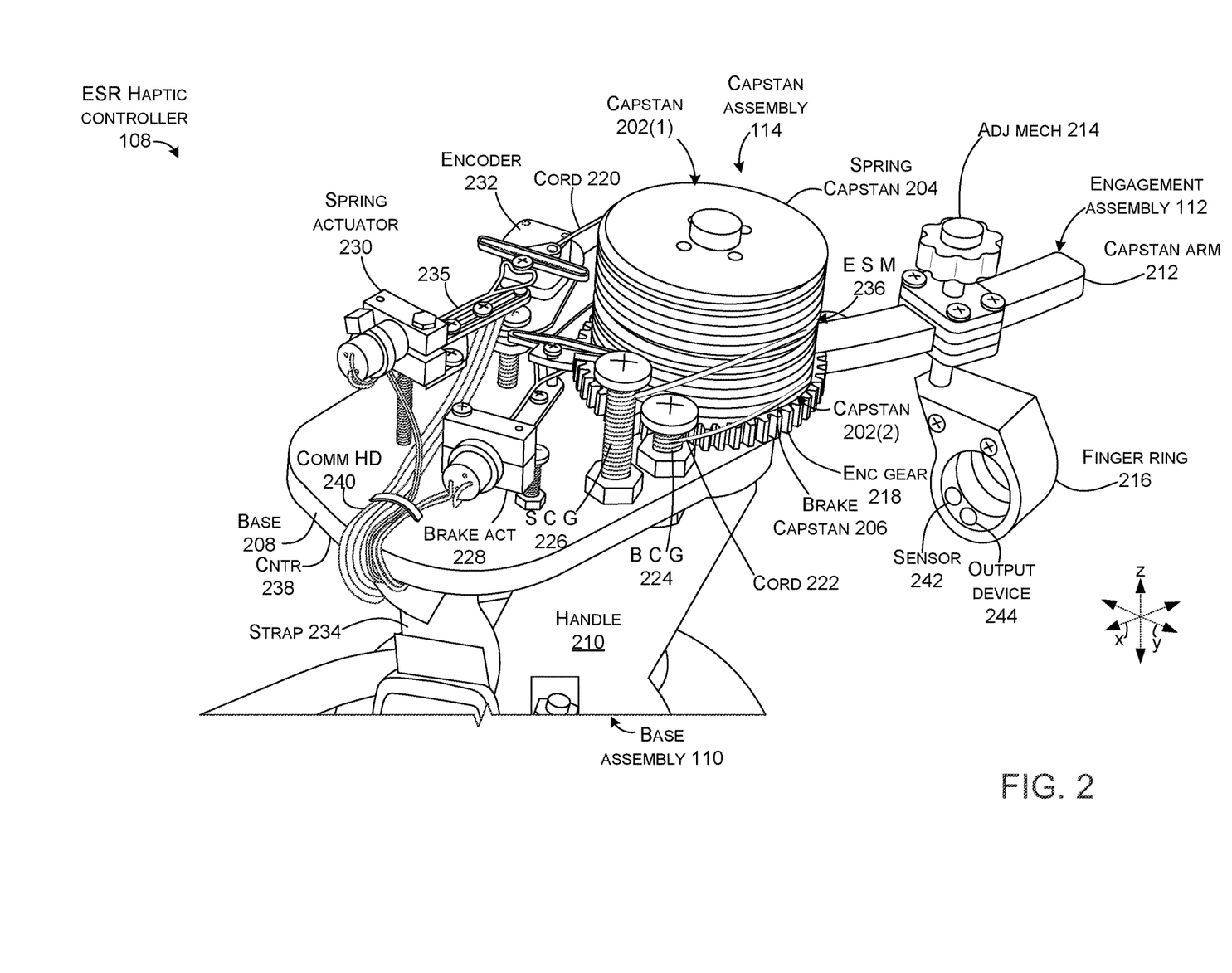
FIGS. 2 and 4-7 illustrate perspective views of example energy-storing resistive haptic controllers, consistent with some implementations of the present concepts.

FIG. 2 shows ESR haptic controller 108, which can include first and second capstans 202. In this case, first capstan 202(1) can operate as a spring capstan 204 and second capstan 202(2) can operate as a brake capstan 206. The haptic controller 108 can also include a base 208, a handle 210, a capstan arm 212, a finger length adjustment mechanism 214, a finger ring 216, an encoder gear 218, a cord 220 for the spring capstan 204, a cord 222 for the brake capstan 206, a brake cord ground (e.g., brake capstan ground) 224, a spring cord ground (e.g., spring cord ground) 226, a brake actuator 228, a spring actuator 230, an encoder 232, and/or a hand strap 234, among other elements. In this case, the brake actuator 228 and the spring actuator 230 are manifest as twisted string actuators 235, which are discussed in more detail relative to FIG. 8.

The ESR haptic controller 108 can also include an energy storage mechanism 236 (not directly visible in this view), a controller 238 (on underside of base and not directly visible in this view), and/or communication components 240. The energy storage mechanism 236 can be connected between the first and second capstans 202. The energy storage mechanism 236 is evidenced in FIGS. 3 and 4. The communication components 240 can facilitate communications between the controller 238 and other devices, such as the base station 102 and/or headset 106, via wires or wirelessly.

The engagement assembly 112 can include sensors 242 and/or output devices 244, both of which are positioned on the finger ring 216 in this case and can be communicatively coupled to the controller 238. The sensors can include any of accelerometers, gyroscopes, cameras, microphones, and/or pressure sensors, among others. The ESR haptic controller 108 can also include other sensors, such as six axis sensors.

The output devices 244, can be speakers, buzzers, actuators, etc. that can augment the haptic feedback provided to the user. For instance, in a scenario where the user is crushing a virtual empty aluminum beverage can, the capstan assembly 114 can provide resistance that the user expects to feel, while the output devices provide the 'crinkling' associated with collapse of the can via sounds and/or vibrations.

As mentioned above, in some cases, the output devices 244 can be actuators. For example, the actuators may be voice coil actuators (VCAs) that can provide wide-band vibrotactile actuation forces with respect to the inertial mass of the VCAs. The actuators can play sounds (in some cases not human-audible sounds, but rather vibrations within the audio spectrum) that provide haptic feedback. For example, a VCA may include a 9 mm diameter voice coil and be capable of generating 55 to 75 decibels of sound pressure level (dbSPL). The actuators can thus provide a kinesthetic perception, including force and proprioception.

The controller 238 can control brake actuator 228, spring actuator 230, and/or output device 244, based upon computer-readable instructions stored on the controller and/or communicated from another device, such as the base station 102 and/or headset 106. As such, the controller 238 can facilitate the resistive friction of a programmable brake for resisting human finger movements. For instance, responsive to user action, the controller 238 can control the brake capstan 206 via the brake actuator 228 and the spring capstan 204 via the spring actuator 230 in a manner that causes energy to be stored in energy storage mechanism 236. For example, the controller 238 can create slightly different resistance to rotation on the spring capstan 204 than the brake capstan 206. This differential can load the energy storage mechanism. The controller 238 can allow this stored energy to create an 'elastic' feel when the user lessens their grip. Application of these concepts can allow the ESR haptic controller 108 to provide features, such as low-cost to implement, simple, safe, operates at human-scale forces, low latency, high speed and low electrical power requirements, among other potential advantages. These features are discussed in more detail below.

Note that the illustrated configuration utilizes first and second capstans 202 to provide resistance to finger movements relating to a single finger. Additional capstans 202 can be added to provide resistance for additional fingers and/or the thumb. For instance, another implementation could provide separate resistance to another finger via third and fourth capstans 202 rotationally secured to the base 208 and configured to rotate around the same or a different axis as the first and second capstans. A second energy storage mechanism can be connected between the third and fourth capstans. A second user engagement assembly can be secured to the third capstan. A third cord can be wound around the third capstan and have a first end secured relative to the base and a second end secured to a third actuator that is secured relative to the base. A fourth cord can be wound around the fourth capstan and have a first end secured relative to the base and a second end secured to a fourth actuator that is secured relative to the base. The controller can control the first and second capstans relative to the first finger and the third and fourth capstans relative to the second finger. Still other implementations could be configured to operate relative to the user's hand and resist movement at the wrist joint (e.g., between the hand and the forearm). Similar implementations can be configured for other appendages (e.g., joints). For instance, the capstans can be implemented in a splint with a hand loop or leg loop, or in a glove, among other configurations.

Figure 3:
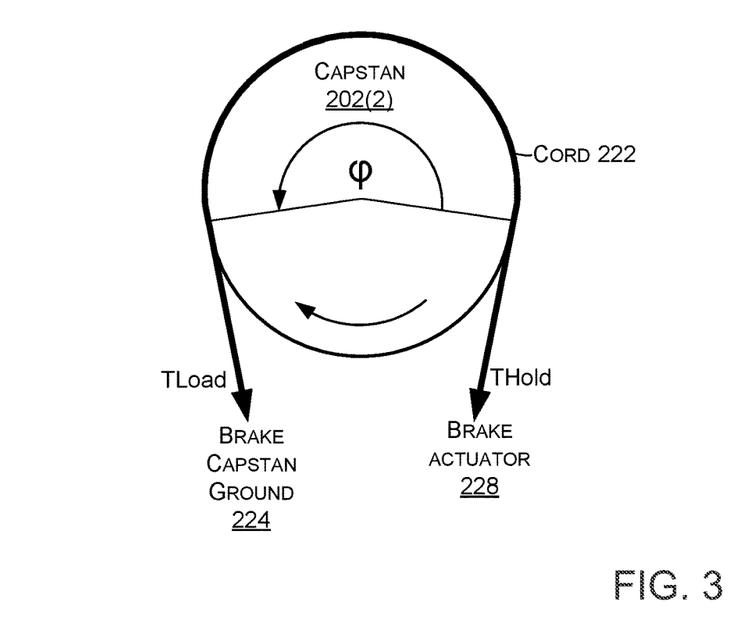
FIG. 3 shows a schematic force diagram relating to an example capstan, consistent with some implementations of the present concepts.

FIG. 3 shows relationships of capstan 202(2), cord 222, brake capstan ground 224, and brake actuator 228. Capstan 202(2) can function as a brake capstan. The brake capstan can leverage the logarithmic force relationship of a capstan (drum) wound with a cord. In this force relationship, cord-capstan friction depends on the fixed total wind angle ($\varphi$) and fixed mutual friction coefficient between cord and capstan drum.

$$T_{load} = T_{hold} e^{\mu\varphi}$$

$$T_{load} > T_{hold}$$

In this implementation, the brake capstan ground 224 can provide higher tension ($T_{load}$) and the brake actuator 228 can provide low tension force ($T_{hold}$).

Figure 4:
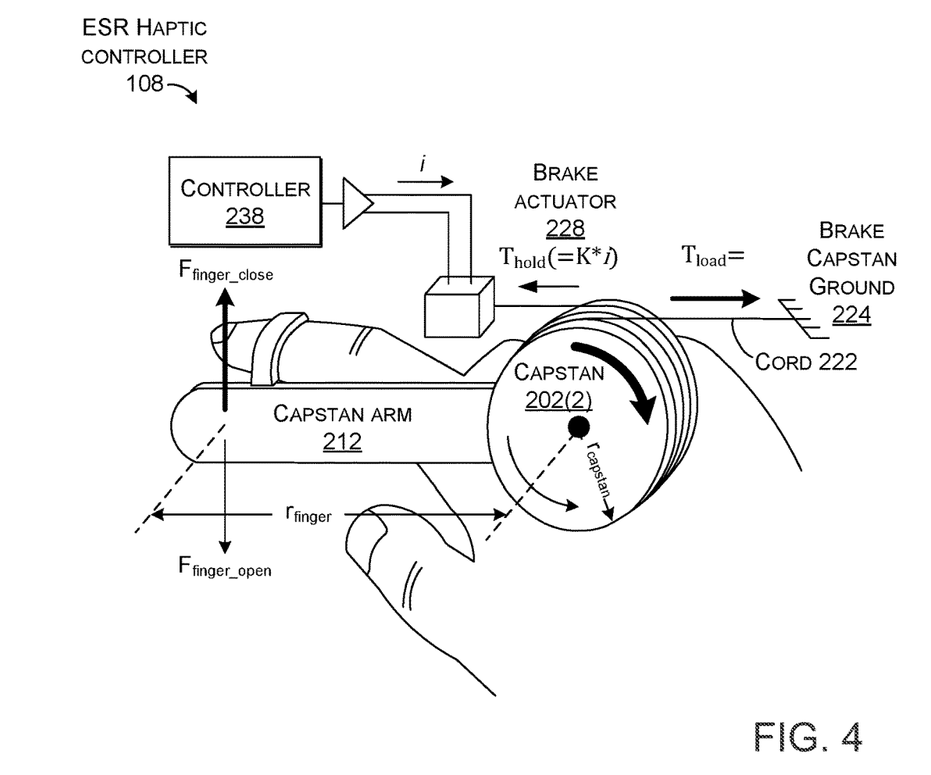

FIG. 4 shows a schematic of some of the brake capstan aspects of ESR haptic controller 108 along with the equations of force. (The spring capstan and the energy storage mechanism not included). Unlike most capstan systems where the cord moves with regard to the capstan drum, the capstan in some ESR haptic controller implementations is rotated by the user's finger. The brake actuator 228 can apply a low-tension force ($T_{hold}$) on the cord and the higher tension ($T_{load}$) side of the cord is fixed (grounded) to the ESR haptic controller 108 by the brake capstan ground 224. Thus, when the user tries to rotate the capstan in a counter-clockwise direction (finger closing) with small or no $T_{hold}$ actuator tension, the capstan 202(2) can rotate more or less freely. As the $T_{hold}$ tension is increased by the brake actuator 228, $T_{load}$ increases exponentially, making the capstan 202(2) harder to turn in the counter-clockwise direction.

$$F_{finger\_close} = (r_{capstan}/r_{finger})T_{load} = (r_{capstan}/r_{finger})T_{hold} e^{\mu\varphi}$$

$$F_{finger\_open} = (r_{capstan}/r_{finger})T_{hold}$$

$$T_{hold}( = K * i).$$

When the user rotates the capstan 202(2) in the clockwise direction, $T_{hold}$ is automatically lessened by moving the cord exit point of the capstan 202(2) closer to the brake actuator 228. With $T_{hold}$ automatically releasing by reversing direction of the capstan (finger opening), some implementation can employ a highly asymmetric force depending on the direction of rotation. This configuration can allow a programmed force as the finger closes and low force as the finger opens where no resistive force is desired. These and other aspects are expanded upon in the discussion below relative to FIGS. 5-7.

Figure 5:
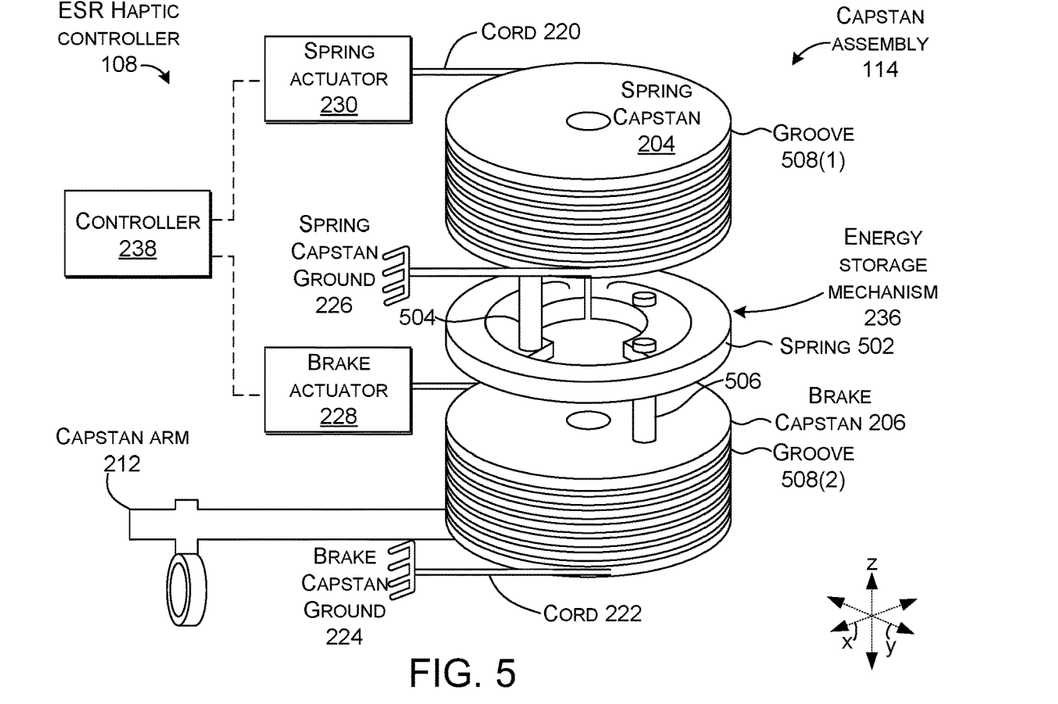
Figure 6:
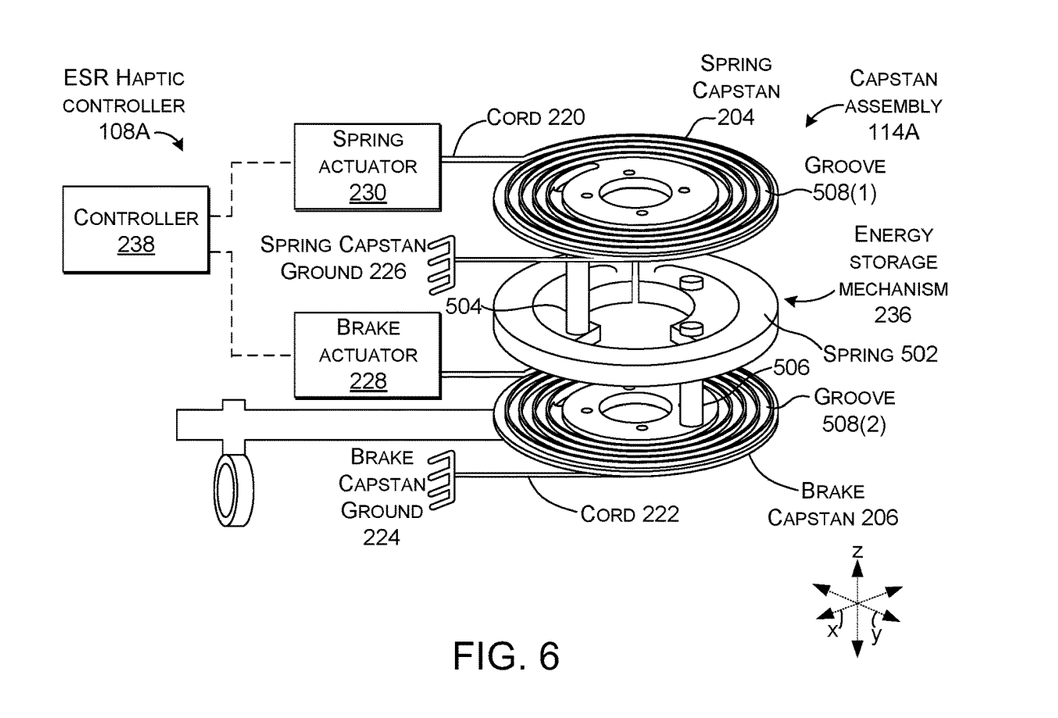
Figure 7:
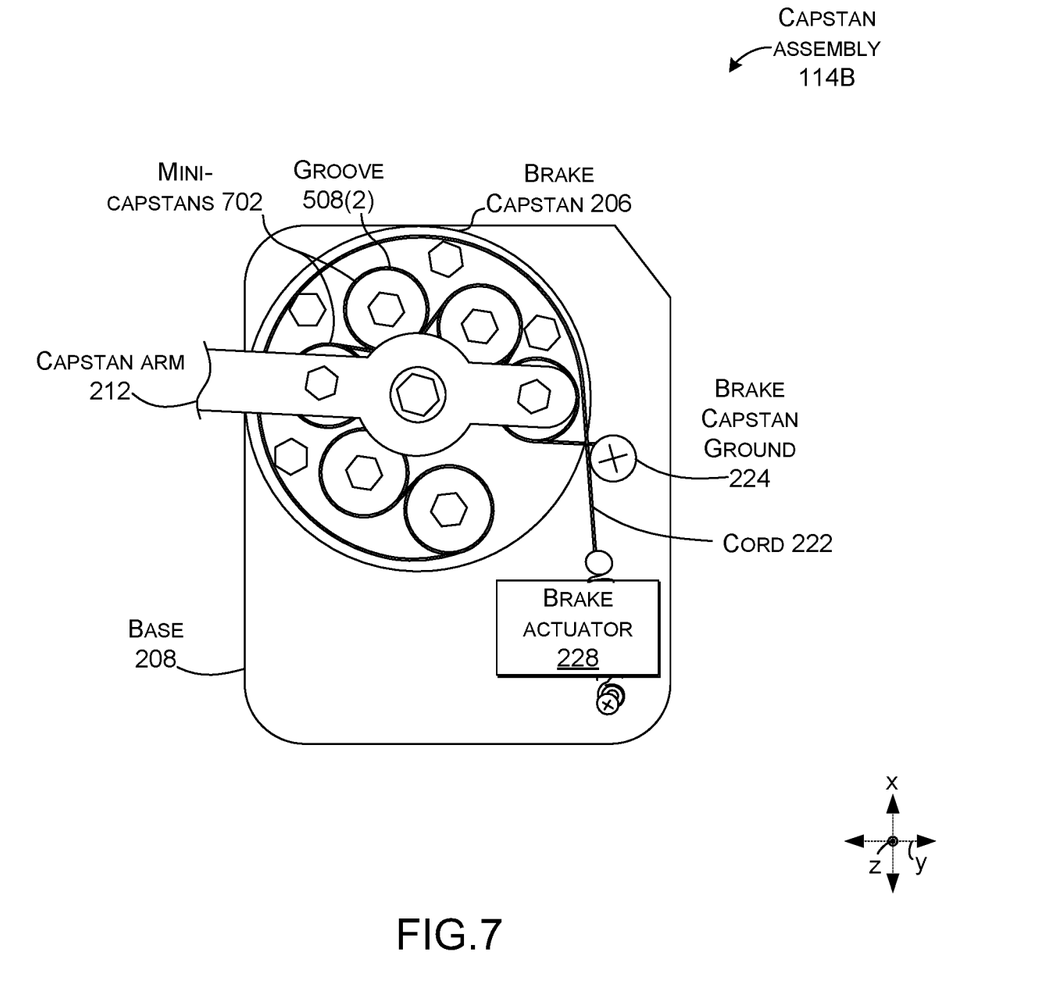

FIGS. 5-7 collectively show further details regarding some features of some implementations of ESR haptic controller 108. FIG. 5 shows an exploded view of the capstan assembly 114. The energy storage mechanism 236 is evident between the spring capstan 204 and the brake capstan 206. In this example, the energy storage mechanism 236 is manifest as a spring 502, such as a torsional spring. One end of the spring 502 is connected to the spring capstan 204 as indicated at 504 and the other end of the spring 502 is connected to the brake capstan 206 as indicated at 506.

In this case, the spring capstan 204 and the brake capstan 206 are vertically stacked (e.g., co-extensive) along a common axis of rotation that is parallel to the z-reference axis. Further, the spring capstan 204 and the brake capstan 206 have the same diameter (e.g., measured in the xy-reference plane), though other implementations can have differing diameters. In this case, the spring capstan 204 and the brake capstan 206 are elongated in height in the vertical direction (e.g., z-reference direction) and have a groove 508 formed therein (e.g., a groove having a helical pattern). The groove 508 can have a diameter that is approximately equal to a diameter of the cords 220 and 222 (e.g., plus or minus 20% of the diameter of the cord in a tensioned state). Cord 220 can be wound around groove 508(1) from the spring capstan ground 226 to the spring actuator 230. Similarly, cord 222 can be wound around groove 508(2) from the brake capstan ground 224 to the brake actuator 228. The groove 508 reduces and/or eliminates the chance of the cord being wound on top of itself and thereby causing the capstan to be inoperable. Toward this end, in some implementations, the grooves can be deeper than they are wide so that the cord fits down in the grooves to further reduce any chance of the cord overlapping on itself.

From one perspective, the illustrated implementation can also offer a modified capstan configuration used as a linear brake and a variable-stiffness spring mechanism using the same capstan-based brake approach to render compliance and push-back in haptic feedback. This can be achieved with a low-cost, low-latency, inexpensive and simple twisted-string actuator whose low force is magnified by the energy storage mechanism. This aspect is described below.

Rotation of either of the spring capstan 204 or the brake capstan 206 relative to the other of the spring capstan 204 and the brake capstan 206 can impart forces on the spring 502. The forces can be stored in the spring 502 and subsequently released. For instance, the user may impart forces on the capstan arm 212 to rotate the capstan arm (e.g., gripping or squeezing motion). Resistance to rotation of the brake capstan can be set by the brake actuator. Recall that the capstan arm 212 can be fixed to the brake capstan 206. Rotating the capstan arm 212 can rotate the brake capstan 206 while the spring capstan 204 remains stationary or rotates less as controlled by tension on the spring actuator. This can impart forces on the spring 502 which can cause energy (from the user) to be stored in the spring. This stored energy can create opposite rotational forces on the capstan arm 212 to mimic squeezing an elastic object (e.g., a foam ball).

The spring capstan 204 and the brake capstan 206 can be formed from any solid material. The grooves can be formed in various ways, such as molded in or machined in after the capstan is formed. The cord 220 and 222 can be formed from various materials, such as polymers, copolymers, metals, etc. The cords can be a single strand or multistrand (e.g., wrapped or braided). While any combination of capstan and cord materials can be employed, some implementations can select pairs of materials that exhibit specific properties. This aspect is described in more detail below.

Note that like most capstan systems, the friction relationship between cord and capstan (e.g., drum) tends to be either static (non-moving capstan with regard to the cord) or dynamic (capstan rotating) and are usually much different in most applications using a capstan. Some implementations can select pairs of materials for the capstans and the cords that have relatively small differences between their static friction coefficients and their kinetic or dynamic friction coefficients, such as 20 percent or less or even 10 percent or less. A relatively small difference and hysteresis between static and dynamic friction (small stick-slip coefficient) can allow operation of the brake in a linear fashion and not just a binary (on/off) mode.

One example material pairing can entail an acetal (e.g., Delrin) for the drum material with Vectran (an LCD plastic from Celanese Corporation) cord. This combination can allow brake operation in a nearly-linear fashion. Further, besides bring slippery on acetal, Vectran has a very high stretch resistance and low creep.

Recall that as mentioned above relative to FIGS. 3 and 4, when the user rotates the capstan 202(2) in the clockwise direction, $T_{hold}$ is automatically lessened by moving the cord exit point of the capstan 202(2) closer to the brake actuator 228. With $T_{hold}$ automatically releasing by reversing direction of the capstan (finger opening), some implementations can employ a highly asymmetric force depending on the direction of rotation. This configuration can allow a programmed force as the finger closes and low force as the finger opens where no resistive force is desired.

In practice, however, a sticking force of the cord 220, 222 to the capstan 204, 206 can exist after a strong closing force event, so that all tension is indeed not released when the user opens their finger. This may be due, at least in part, to the weave of the Vectran cord, partially seating into the soft acetal of the capstan.

One solution to the sticking force can be achieved with the finger position encoder 232. The finger position encoder can provide the angular orientation of the capstan arm 212 relative to a point on the base 208. When information from the finger position encoder 232 indicates that the user is opening their finger, the controller 238 can apply a small reverse pulse to the brake actuator 228, which further releases the low-side tension on the cord 222 and thus releases the brake capstan 206 (e.g., drum) to rotate freely.

Thus, the haptic controller 108 can provide a (nearly) linear brake functionality via the brake capstan 202. The haptic controller 108 can provide a variable-stiffness spring functionality using the same capstan-based brake approach in combination with the energy storage mechanism 236 and the spring capstan 204 to render compliance and push-back in haptic feedback.

FIG. 6 shows an alternative capstan assembly 114A of ESR haptic controller 108A. This capstan assembly 114A can employ flattened spring capstan 204 and brake capstan 206 that are vertically constrained (e.g., occupy less space in the z-reference direction) even though the grooves 508 can make the same (or a similar) number of wraps around the z-reference axis. In this case, the groove can form a spiral pattern on both sides of a flattened disk-shaped capstan. For purposes of explanation, this capstan can be viewed as being similar to a phonographic record with a passthrough from the groove 508 on one side to the groove 508 on the other side. The spiral capstan implementation can reduce the overall size of the capstan assembly, making it more adaptable for inclusion in various handheld ESR haptic controller 108A, especially those that independently address multiple fingers.

FIG. 7 shows another capstan assembly 114B that employs a flattened capstan configuration. In this case, the groove 304(2) is defined by multiple flattened 'mini-capstans' 702 (not all of which are designated with specificity). The flattened mini-capstans 702 are radially arranged around the axis of rotation (e.g., the axis of rotation is parallel to the z-reference axis). The total wraps of cord of the capstan can be calculated as the sum of the wraps around the individual mini-capstans.

Figure 8:
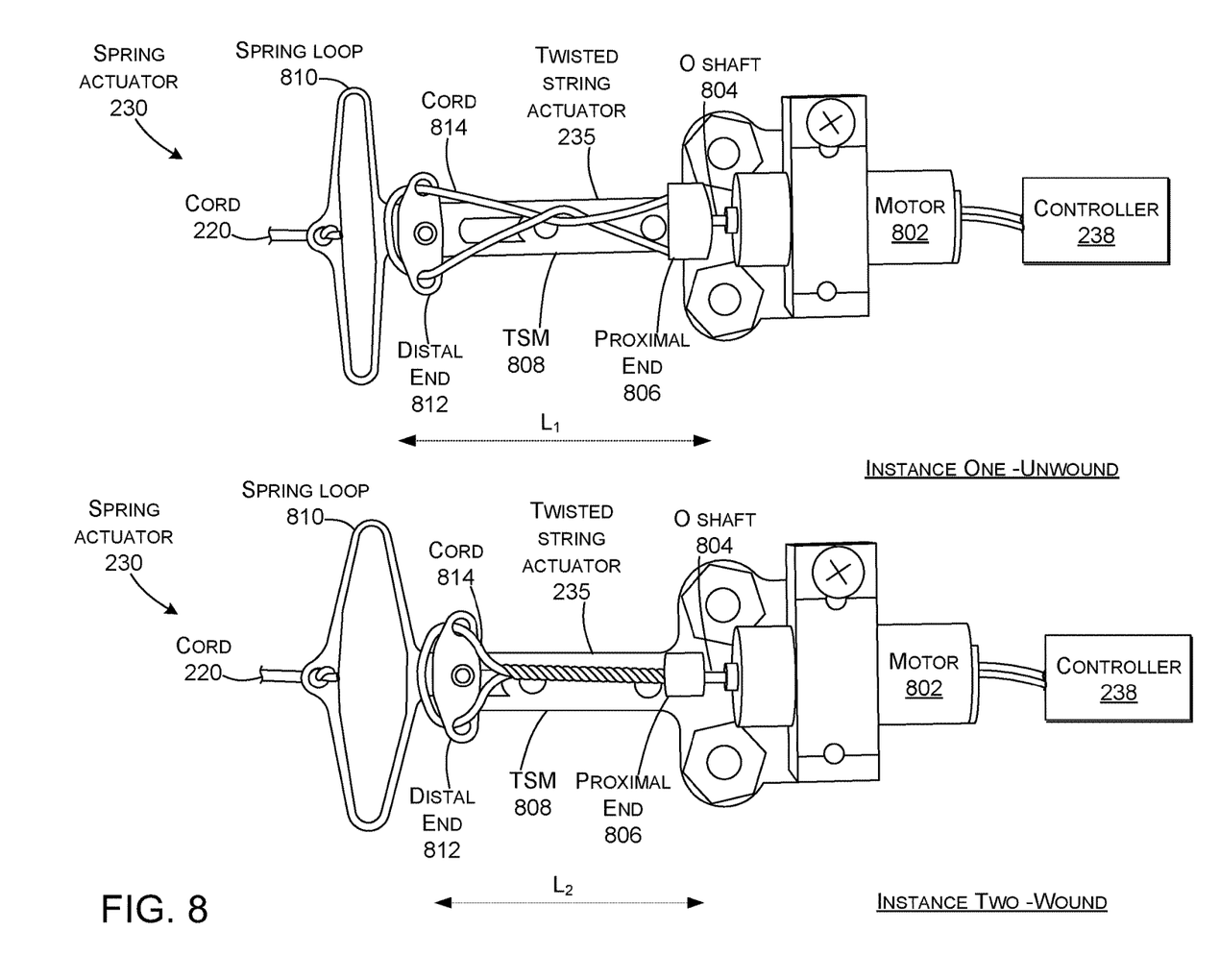
FIG. 8 shows an elevational view of an example actuator, consistent with some implementations of the present concepts.

FIG. 8 shows details of the spring actuator 230, which is manifest as twisted string actuator 235. These details are equally applicable to brake actuator 228. The controller 238 is electrically coupled to motor 802. An output shaft 804 of the motor 802 is connected to a proximate end 806 (e.g., hub) of a twisted string mechanism 808. The twisted string mechanism can function as a rotationally fixed but sliding arm. The cord 220 is connected to a spring loop 810. The spring loop 810 extends between the cord and a distal end 812 of the twisted string mechanism 808. A string or cord 814 can extend from the proximate end 806 of the twisted string mechanism 808, loop around the distal end 812 and return to the proximate end 806.

Instance One shows the twisted string actuator 235 in an unwound state where the twisted spring actuator has a length $L_1$. Instance Two shows the twisted string actuator 235 in a wound state where the controller 238 has activated motor 802 and spun the output shaft in a first direction (e.g., clockwise or counter-clockwise). The output shaft turned and wound cord 814, which shortened the length $L_2$ of the twisted string actuator 235. Stated another way, as the cord 814 is wound by the motor 802, the cord pulls on the sliding arm coupled to the spring loop 810 and applies cord tension to the HOLD side of the capstan as a function to current supplied to the motor. This shortening of the length puts tension on cord 220 via spring loop 810. The tension on the spring loop can slightly expand spring loop 810, which can help to keep tension on the cord consistent in the wound state. Stated another way spring loop 810 can serve a compliance function added to the actuator to make up for the small apparent cord stretch as tension is increased and the capstan turns, changing both of the HOLD and LOAD tensions a small amount.

In the wound state, tension on the cord 220 can easily be adjusted by spinning the output shaft further in the same direction, or lessened by spinning the output shaft in the opposite direction.

While any type of actuator can be employed, the twisted string actuator (TSA) 235 can provide efficiency in converting electrical energy to mechanical energy plus its back-drivability, which can be better than with gears, such as spur gears. Also, because of its energy conversion efficiency plus low inertial load and coreless motor design, the response and latency can be much faster than other reasonably priced options. The TSA also tends to produce less noise than is characteristic of actuators with gears. Further, the twisted spring actuator can provide relatively quick response times to avoid lag that is detectable by the user. Further, TSAs are often viewed unfavorably due to their low force, however, the capstan assembly does not rely on high tension force from the controller and thus can leverage the beneficial aspects of the TSA while minimizing any potentially negative aspects.

Various aspects have been discussed in detail above. Context for these aspects can be provided by returning to FIG. 2. The controller 238 can control the ESR haptic controller 108 based upon input from the finger position encoder 232. The controller 238 can convert rotary potentiometer encoder output geared to the brake capstan 206. The controller 238 can adjust its force feedback behavior and spring engagement by driving the respective actuator via pulse width modulation (PWM) signal, which can produce predictable and repeatable forces in resistance following from the capstan equations of FIGS. 3 and 4.

This configuration can synthesize many haptic scenarios. When the finger position encoder 232 reports the appropriate contact position with the object, the controller 238 can actuate the capstan brake 206 via the brake actuator 228 to the desired low-tension force which is immediately mechanically communicated to the user's finger as a resistive force. For the simulation of squeezing something less hard than a rigid object, like clay for example, the brake actuator 228 is commanded to actuate at a lesser force than with a rigid material. The user feels the contact with the clay but with enough applied force, is able to squeeze and deform it with the appropriate visuals appearing in the VR display.

The controller 238 can further synthesize scenarios where the virtual object pushes back (e.g., active force from the device pushing on the user's finger) to simulate a spring or other compliant haptics. The controller 238 can synthesize the haptic perception of compliance by employing the second (e.g., spring capstan 204) that is connected to the brake capstan 206 through spring 502 or other energy storage mechanism 236, such as an elastic band. This second capstan (e.g., spring capstan 204) can function as a clutch to engage the spring at the appropriate time.

The spring capstan 204 can also have its high-tension load ($T_{Load}$) cord side grounded to the controller body or base 208 via the spring capstan ground 226 and the low-tension ($T_{Hold}$) side connected to a second low force actuator (e.g., spring actuator 230). With no actuation of the spring and brake capstans, they rotate freely with finger closing. If just the spring capstan 204 is actuated at maximum force, the finger movement and brake capstan 206 are connected through the rotary spring (e.g., energy storage mechanism 236) and capstan to ground. In this case, the user experiences squeezing a spring with a constant spring coefficient, k. Thus, $$\text{Finger\_closing\_force} = k * \text{Finger\_closing\_distance}.$$

Note that k is a constant in this case. If the spring capstan 204 is allowed to slip due to a smaller actuation force and/or apply a small linear braking force, the controller 238 can modulate the perceived spring constant k' that the user feels. The perceived compliance now is a function of the fixed spring constant, how much the spring capstan slips and how much brake is applied. The controller 238 can be programmed to synthesize many different perceived spring behaviors by using these variables.

Figure 9:
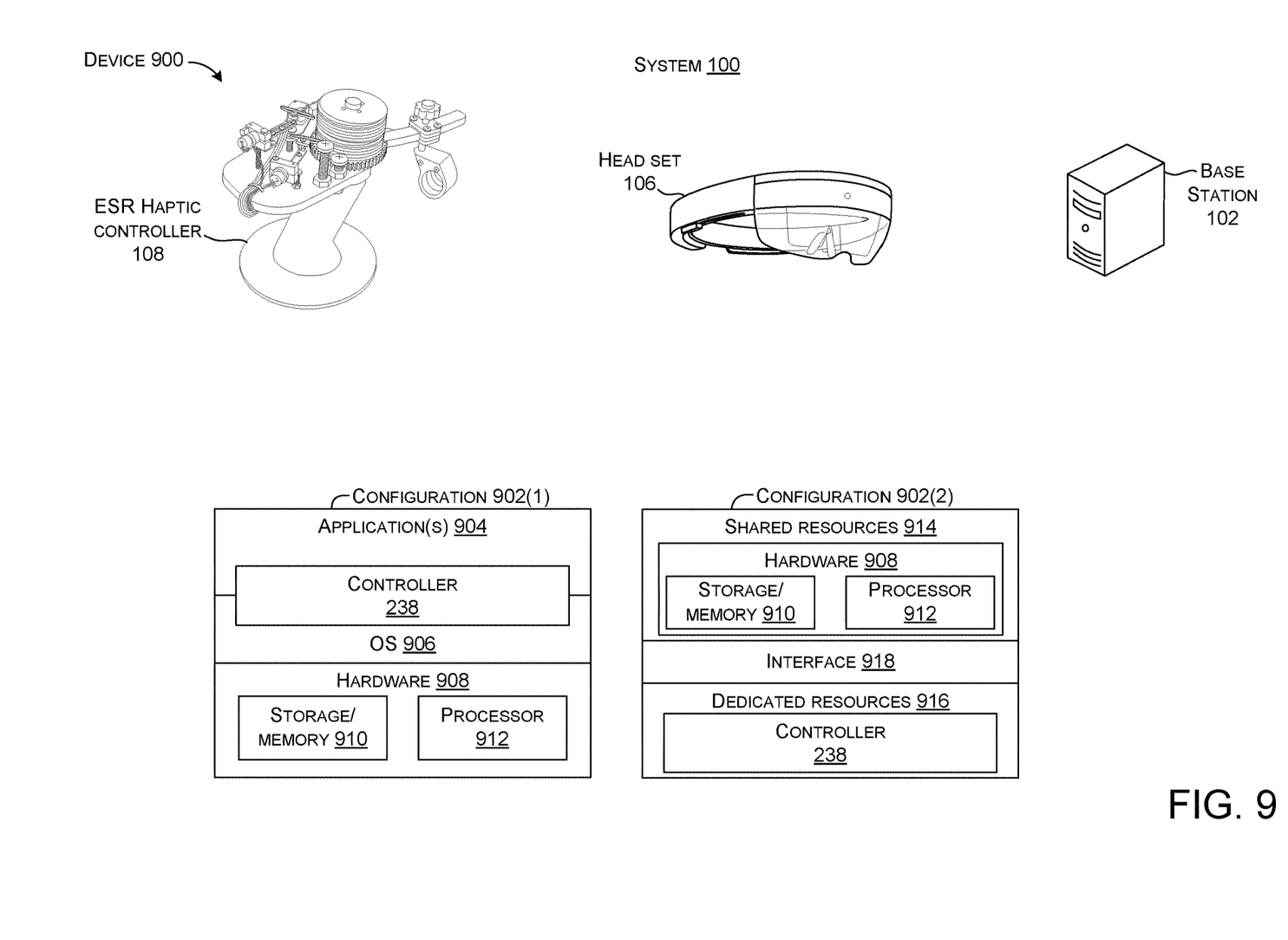

FIG. 9 shows further details of system 100, consistent with some implementations of the present concepts. The system 100 may include devices 900, such as the ESR haptic controller 108, headset 106, base station 102, and/or other devices, such as personal computers, desktop computers, notebook computers, cell phones, smart phones, personal digital assistants, pad type computers, mobile computers, wearable devices, cameras, appliances, smart devices, IoT devices, vehicles, etc., and/or any of a myriad of ever-evolving or yet-to-be-developed types of computing devices. As mentioned above, any of these devices 900 can operate in a free-standing manner to achieve a given functionality or can operate cooperatively with other devices to achieve the functionality.

FIG. 9 shows two example device configurations 902 that can be employed by ESR haptic controller 108, headset 106, base station 102, and/or other devices. Individual devices, such as ESR haptic controller 108 can employ either of configurations 902(1) or 902(2), or an alternate configuration. (Due to space constraints on the drawing page, one instance of each device configuration is illustrated rather than illustrating the device configurations relative to each device). Briefly, device configuration 902(1) represents an operating system (OS) centric configuration. Device configuration 902(2) represents a system on a chip (SOC) configuration. Device configuration 902(1) is organized into one or more applications 904, operating system 906, and hardware 908. The hardware 908 can include storage/memory 910 and a processor 912. Other hardware 908, such as the base assembly 110, engagement assembly 112, and capstan assembly 114, are described in detail above relative to FIG. 2 and are not reintroduced here. Device configuration 902(2) is organized into shared resources 914, dedicated resources 916, and an interface 918 therebetween.

The controller 238 can be manifest as software that is stored on storage/memory 910 and executed by the processor 912. In other cases, the controller 238 may be a dedicated hardware or firmware controller, such as a microcontroller. The controller can receive information relating to a scenario, such as a virtual reality scenario, a training scenario, etc. The information can include information about the properties of an object that the user is grasping, such as the object's elasticity, and/or texture, among others. The controller can also receive information about a user's body part, such as a finger, arm, or leg, among others. The controller can generate signals to control the device, such as the ESR haptic controller 108, to synthesize the tactile feedback that the user would experience when grabbing the 'actual' object.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 902(2) can be thought of as a system on a chip (SOC) type design. In such a case, functionality provided by the device can be integrated on a single SOC or multiple coupled SOCs. One or more processors 912 can be configured to coordinate with shared resources 914, such as storage/memory 910, etc., and/or one or more dedicated resources 916, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, and/or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 10:
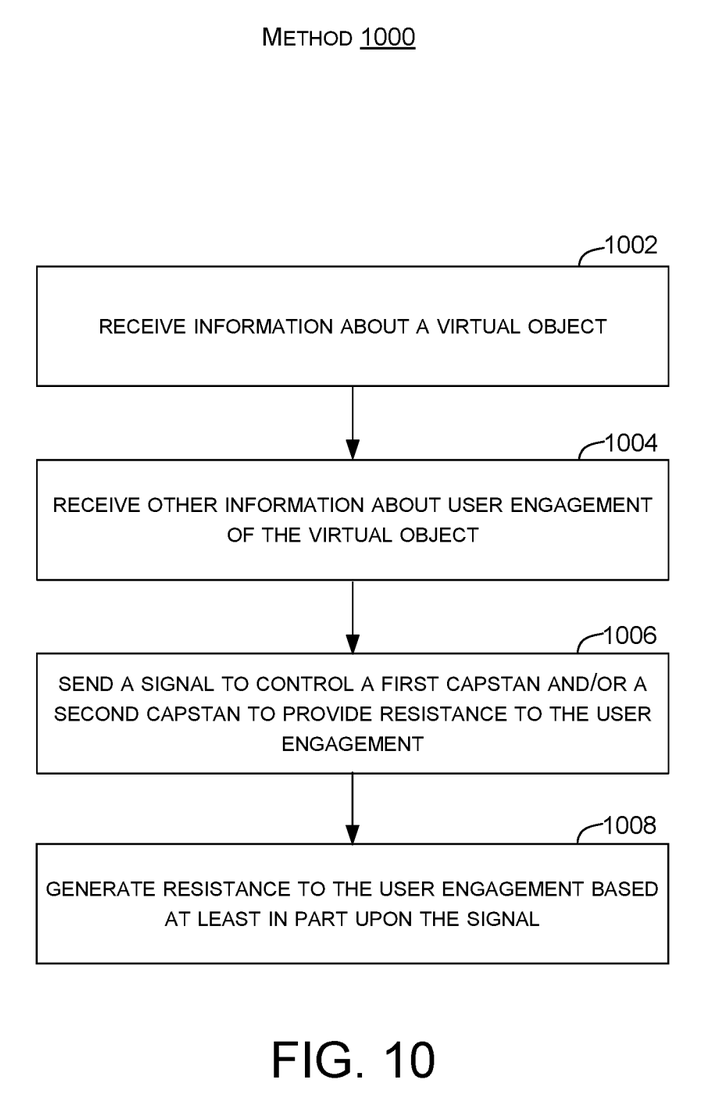
FIG. 10 shows a flowchart of an example energy-storing resistive haptic control method, consistent with some implementations of the present concepts.

FIG. 10 shows a flowchart illustrating an example method 1000 relating to simulating an object. In act 1002, the method can receive information about a virtual object. The information can include various properties, such as size, texture, hardness, elasticity, etc. In act 1004, the method can receive other information about user engagement of the virtual object. The other information can be obtained from various sensors, such as pressure sensors and/or positional sensors. For instance, positional sensors can indicate that the user is applying a force relative to the virtual object that is causing rotation of an element that the user is engaging. For instance, the user engagement may cause rotation of a capstan arm relative to a base. The pressure sensors may directly or indirectly sense pressure that the user is creating with the engagement. For instance, pressure sensors positioned in a finger ring may sense pressure that the user is generating against the finger ring. Similarly, the capstan arm could extend across the user's wrist so that the user's movement of their hand relative to their forearm is sensed by positional sensors and/or pressure sensors.

In act 1006, the method may send a signal to control a first and/or a second capstan to provide resistance to the user engagement. The signal can be based at least in part upon the information and the other information. In some configurations, the signal may be directed to an actuator, such as an actuator associated with the first and/or second capstans.

In act 1008, the method can generate resistance to the user engagement based, at least in part, upon the signal. For instance, the first capstan may be a brake capstan. If the object is an inelastic object, actuation of the brake capstan can simulate resistance that would be felt when engaging a 'real' object. The signal can be used to energize an actuator that tensions a cord on the brake capstan. If the object is elastic, energy can be stored while resisting the user engagement by sending the signal to the second capstan (e.g., the spring capstan). This stored energy can be utilized to simulate the elastic nature of the object as the user lessens their engagement (e.g. stops squeezing as hard). In some cases, the two capstans can be interconnected by an energy storage mechanism. By controlling the relative rotation between the two capstans, energy can be stored in the energy storage mechanism. This energy can be released to synthesize elastic properties of the object. Note, the method does not need to generate this energy, instead the method can store energy added by the user engagement.

Various examples are described above. Additional examples are described below. One example includes a device comprising a base, first and second capstans rotationally secured to the base and configured to rotate around a common axis, an energy storage mechanism connected between the first and second capstans, a user engagement assembly secured to the first capstan, a first cord wound around the first capstan and having a first end secured relative to the base and a second end secured to a first actuator that is secured relative to the base, and a second cord wound around the second capstan and having a first end secured relative to the base and a second end secured to a second actuator that is secured relative to the base.

Another example can include any of the above and/or below examples where the base comprises a handle, a splint, or a glove.

Another example can include any of the above and/or below examples where the handle is co-extensive with the common axis.

Another example can include any of the above and/or below examples where the first and second capstans are identical in height and width or wherein the first and second capstans are different in height and/or width.

Another example can include any of the above and/or below examples where the first and second capstans are elongated along the common axis or wherein the first and second capstans are flattened along the common axis.

Another example can include any of the above and/or below examples where the first and second capstans are grooved.

Another example can include any of the above and/or below examples where the first and second capstans are grooved in a helical pattern.

Another example can include any of the above and/or below examples where the first and second capstans are grooved in a spiral pattern.

Another example can include any of the above and/or below examples where the first and second capstans define helical grooves that have a diameter that is equal to a diameter of the first and second cords.

Another example can include any of the above and/or below examples where a material of the first and second capstans and a material of the cords have static and dynamic friction coefficients that are with 10% of one another.

Another example can include any of the above and/or below examples where the first and second actuators comprise first and second twisted string actuators.

Another example can include any of the above and/or below examples where the energy storage mechanism comprises a spring.

Another example can include any of the above and/or below examples where the user engagement assembly comprises an arm and a finger ring or wherein the user engagement assembly comprises an arm and a hand loop.

Another example can include any of the above and/or below examples where the device further comprises a sensor configured to sense an angular orientation of the arm relative to the base and/or rotation of the arm relative to the base.

Another example can include any of the above and/or below examples where the sensor senses the arm directly or wherein the sensor senses the first and/or second capstan.

Another example can include any of the above and/or below examples where the sensor comprises a finger position encoder.

Another example can include any of the above and/or below examples where the device further comprising a controller configured to control actuation of the first and second actuators based at least in part upon data from the sensor.

Another example can include any of the above and/or below examples where the device further comprising third and fourth capstans rotationally secured to the base and configured to rotate around the common axis, a second energy storage mechanism connected between the third and fourth capstans, a second user engagement assembly secured to the third capstan, a third cord wound around the third capstan and having a first end secured relative to the base and a second end secured to a third actuator that is secured relative to the base, and a fourth cord wound around the fourth capstan and having a first end secured relative to the base and a second end secured to a fourth actuator that is secured relative to the base.

Another example includes a device comprising first and second capstans rotationally secured to a base, an energy storage mechanism connected between the first and second capstans, a user engagement assembly secured to the first capstan, and a controller configured to control rotational forces imparted on the user engagement assembly by controlling rotational friction experienced by the first and second capstans.

Another example includes a computer implemented method comprising receiving information about a virtual object, receiving other information about user engagement of the virtual object, and sending a signal to control a first capstan and/or a second capstan to provide resistance to the user engagement.

Various examples are described above. Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

The invention claimed is:

1. A device, comprising:
a base;
first and second capstans rotationally secured to the base and configured to rotate around a common axis;
an energy storage mechanism connected between the first and second capstans and configured to store energy when the first and second capstans are rotated relative to one another;
a user engagement assembly secured to the first capstan and extending radially relative to the common axis;
a first cord wound around the first capstan and having a first end secured relative to the base and a second end secured to a first actuator that is secured relative to the base;
a second cord wound around the second capstan and having a first end secured relative to the base and a second end secured to a second actuator that is secured relative to the base; and,
a controller configured to control the first actuator to adjust tension of the second end of the first cord and to control the second actuator to adjust tension of the second end of the second cord.

2. The device of claim 1, wherein, the base comprises a handle, a splint, or a glove.

3. The device of claim 2, wherein, the handle is co-extensive with the common axis.

4. The device of claim 1, wherein the first and second capstans are identical in height and width, or wherein the first and second capstans are different in height and/or width.

5. The device of claim 1, wherein the first and second capstans are elongated along the common axis or wherein the first and second capstans are flattened along the common axis.

6. The device of claim 1, wherein the first and second capstans are grooved.

7. The device of claim 6, wherein the first and second capstans are grooved in a helical pattern.

8. The device of claim 6, wherein the first and second capstans are grooved in a spiral pattern.

9. The device of claim 1, wherein the first and second capstans define helical grooves that have a diameter that is equal to a diameter of the first and second cords.

10. The device of claim 1, wherein a material of the first and second capstans and a material of the first and second cords have static and dynamic friction coefficients that are with 10% of one another.

11. The device of claim 1, wherein the first and second actuators comprise first and second twisted string actuators.

12. The device of claim 1, wherein the energy storage mechanism comprises a spring.

13. The device of claim 1, wherein the user engagement assembly comprises an arm and a finger ring or wherein the user engagement assembly comprises an arm and a hand loop.

14. The device of claim 13, further comprising a sensor configured to sense an angular orientation of the arm relative to the base and/or rotation of the arm relative to the base.

15. The device of claim 14, wherein the sensor senses the arm directly or wherein the sensor senses the first and/or second capstans.

16. The device of claim 15, wherein the sensor comprises a finger position encoder.

17. The device of claim 14, wherein the controller is configured to adjust the tension on the first end of the first cord and the first end of the second cord by controlling actuation of the first and second actuators based at least in part upon data from the sensor.

18. The device of claim 17, further comprising third and fourth capstans rotationally secured to the base and configured to rotate around the common axis, a second energy storage mechanism connected between the third and fourth capstans, a second user engagement assembly secured to the third capstan, a third cord wound around the third capstan and having a first end secured relative to the base and a second end secured to a third actuator that is secured relative to the base, and a fourth cord wound around the fourth capstan and having a first end secured relative to the base and a second end secured to a fourth actuator that is secured relative to the base.

19. A device, comprising:
first and second capstans rotationally secured to a base;
an energy storage mechanism connected between the first and second capstans and configured to store energy when the first and second capstans are rotated at different rates;
a user engagement assembly secured to the first capstan; and,
a controller configured to control rotational forces imparted on the user engagement assembly by controlling rotational friction experienced by the first and second capstans and the energy storage mechanism is configured to contribute to the rotational forces with the stored energy.

20. A device, comprising:
first and second capstans rotationally secured to a base;
an energy storage mechanism connected between the first and second capstans and configured to store energy when the first and second capstans are rotated relative to one another;
a user engagement assembly secured to the first capstan; and,
a controller configured to control resistance to rotation imparted on the user engagement assembly by controlling rotational friction experienced by the first capstan and the second capstan based at least in part upon properties of a virtual object simulated by the user engagement assembly.

* * * * *